(12) United States Patent
Bilder

(10) Patent No.: US 6,292,542 B1
(45) Date of Patent: Sep. 18, 2001

(54) METHOD AND APPARATUS FOR HANDLING AN IN-CALL REQUEST FOR EMERGENCY SERVICES

(75) Inventor: Mitchell K. Bilder, Manalapan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/371,809

(22) Filed: Aug. 11, 1999

(51) Int. Cl.[7] .................................................. H04M 11/04
(52) U.S. Cl. .......................... 379/45; 379/37; 379/201.01
(58) Field of Search ................................. 379/45, 37, 38, 379/39, 40, 41, 42, 43, 44, 201

(56) References Cited

U.S. PATENT DOCUMENTS

| | | | |
|---|---|---|---|
| 5,249,223 | | 9/1993 | Vanacore ............................... 379/221 |
| 5,444,760 | * | 8/1995 | Russ ......................................... 379/45 |
| 6,028,915 | * | 2/2000 | McNevin ................................ 379/40 |
| 6,031,836 | * | 2/2000 | Haserodt ........................... 379/90.01 |

* cited by examiner

*Primary Examiner*—Curtis Kuntz
*Assistant Examiner*—Melur Ramakrishnaiah

(57) ABSTRACT

Alternate methods for accessing emergency services, such as conventional 911 services, are provided. Emergency services can be requested during an ongoing call and the emergency services requestor along with at least one other party involved in the ongoing call can be bridged to the emergency services operator. Alternately, the ongoing call can be terminated and only the emergency services requestor be connected to the emergency services. An interexchange carrier can determine appropriate routing for the emergency services call and connect the requestor to the appropriate emergency services. The interexchange carrier can maintain emergency services databases that contain the same information as that in databases maintained by a local exchange carrier. In addition, the interexchange carrier can provide emergency services directory services so that callers can obtain emergency services information, such as telephone numbers, for emergency service providers in distant areas.

13 Claims, 2 Drawing Sheets

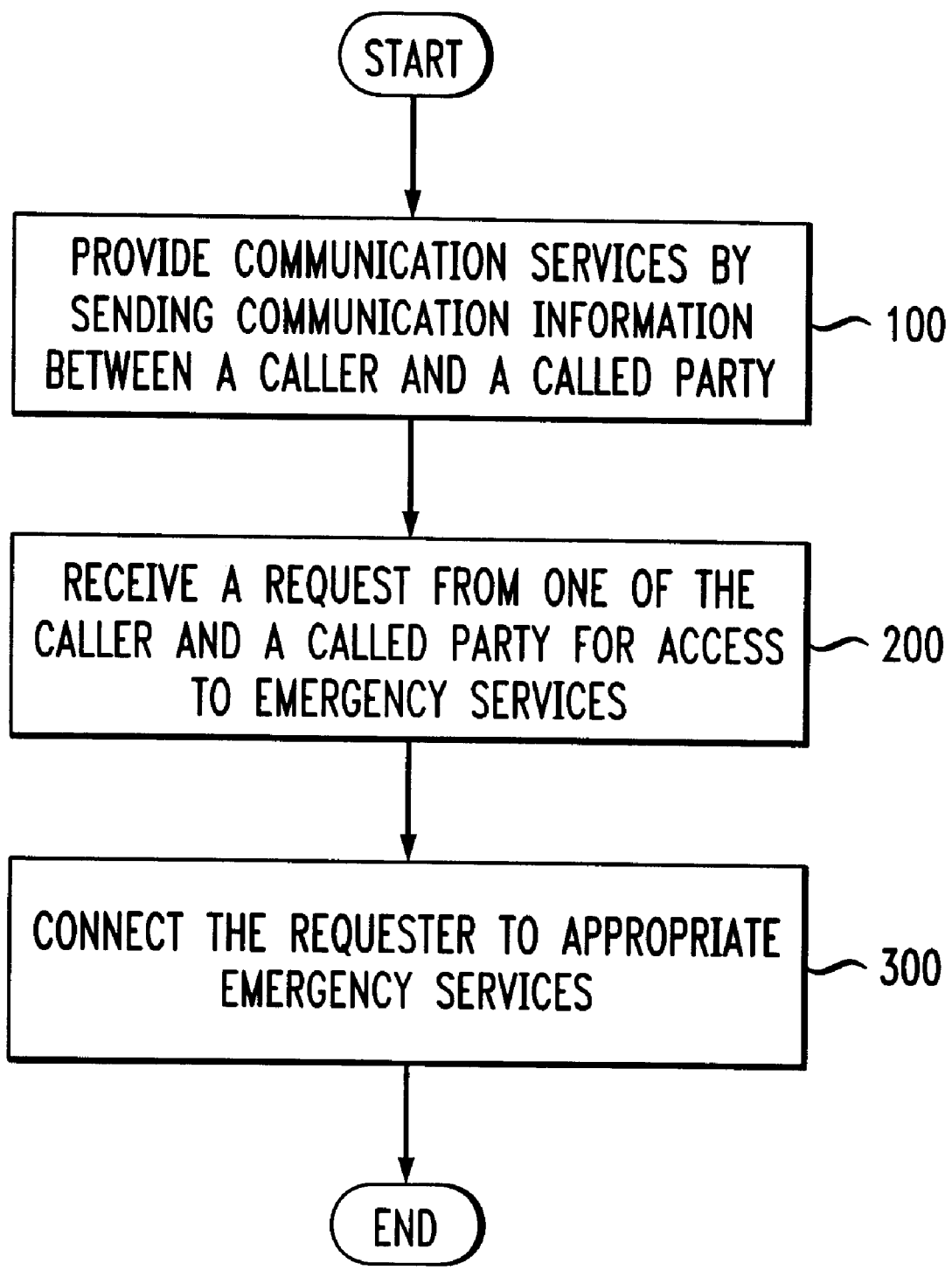

METHOD AND APPARATUS FOR HANDLING AN IN-CALL REQUEST FOR EMERGENCY SERVICES

BACKGROUND OF THE INVENTION

1. Field of Invention

This invention relates to accessing emergency services in a communications environment.

2. Description of Related Art

Emergency services, such as 911 services, can usually be obtained by taking a telephone receiver "off-hook", and dialing an alphanumeric code, such as "911", into the telephone. A local exchange carrier receives the request, determines the appropriate emergency service provider, and connects the caller with the emergency service provider. As another example of how a caller can access emergency services, a caller could dial a telephone number for a local police station and be connected with an emergency dispatch operator who determines the nature of the emergency and dispatches appropriate emergency response units.

SUMMARY OF THE INVENTION

The invention provides a method and apparatus for providing emergency services during an ongoing call, such as a local or long distance telephone call, conference call, etc. For example, a person engaged in a long distance telephone call with a friend or friends could request and receive emergency services without discontinuing the call with the friend. The request for emergency services can be made in different ways, including pressing a key or series of keys on a telephone or other communication device, speaking a word or series of words into the communication device, etc. In response, a long distance or local exchange carrier can recognize the key sequence or words and connect the requesting party with appropriate emergency services, such as a 911 dispatch operator. The ongoing call need not be terminated when the requesting party is connected with emergency services. Instead, the requesting party and other parties involved in the call can be bridged with an emergency services operator or other emergency service. Alternately, only the requesting party could be connected with the emergency services, and the original call terminated.

Bridging of the requesting party and another party involved in a call with an emergency services operator can be useful, especially in circumstances where the requesting party becomes incapacitated, e.g., has a heart attack, or when the requesting party is actually requesting emergency services for the other party involved in the original call. For example, the other party could tell the requesting party that something is happening, such as an intruder is entering the party's home, and yet not have the presence of mind to request emergency services. In this case, the requesting party could request emergency services for the other party and instruct an emergency services operator to provide emergency services at the other party's home and/or provide other useful information. As another example, the other party could determine that a nearby person was involved in a medical emergency, tell this to the requesting party during a call and ask the requesting party to request emergency services. Thus, the requesting party could request emergency services and provide information, such as the address or medical history for the person requiring emergency medical services, while the other party attends to the emergency. An individual at the actual scene of the medical emergency could also be bridged with the emergency services operator to provide more current information or receive instructions regarding how to treat the medical emergency.

As discussed above, emergency services can be requested during either a local or a long distance telephone call. If the emergency services are requested during a long distance telephone call, a long distance, or interexchange, carrier could recognize the request and access an appropriate emergency services database to determine the address, e.g., routing information, for the appropriate emergency services provider. The emergency services database could be maintained by the interexchange carrier, or the interexchange carrier could access an emergency service database maintained by an exchange carrier local to the party needing emergency services. Once the routing information or other address for the appropriate emergency service provider is identified, the requesting party and/or the other party involved in the ongoing telephone call can be connected to the emergency service. The emergency services database maintained by the interexchange carrier can be a mirror database or very similar to a database maintained by local exchange carriers.

Alternately, the interexchange carrier could connect the requesting party to an emergency service that is maintained by the interexchange carrier or that is a more regional emergency service than that to which a local exchange carrier would have connected the requesting party. For example, a national emergency operator could be connected to the requesting party, determine the nature and/or location of the emergency and provide necessary information, such as poison control or directory assistance information, directly dispatch emergency service providers to the appropriate location or connect the requesting party to a more local emergency service, such as a police station.

For example, a party in New York could request poison control information from the interexchange carrier during a call with a party in Florida and be simultaneously connected with the party in Florida and a national poison control operator. The poison control operator could instruct the party in Florida how to deal with a specific problem, e.g., if a child has eaten a poisonous substance, while being connected to the New York party. This service may be useful, for example, when the party in Florida does not speak English and the party in New York can translate instructions from the poison control operator. Of course, both parties need not be bridged with the emergency service.

As another example, a party involved in an interstate long distance telephone call could request and receive emergency services information, such as a telephone number for a police station local to the other party involved in the telephone call. For example, the party in New York calling the party in Florida could receive an indication from the party in Florida that an emergency situation is occurring. The party in New York could request emergency services, and obtain a telephone number for a police station, fire station, or other emergency service provider local to the party in Florida. The interexchange carrier could also connect the parties in New York and Florida to the local emergency services provider without terminating the original telephone call.

These and other aspects of the invention will be apparent and/or obvious from the description provided below.

BRIEF DESCRIPTION OF THE DRAWINGS

The invention is described in detail with regard to the following figures wherein like numerals reference like elements, FIG. 2 is a flowchart of steps of a method for providing emergency services.

DETAILED DESCRIPTION OF PREFERRED EMBODIMENTS

Figure 1:
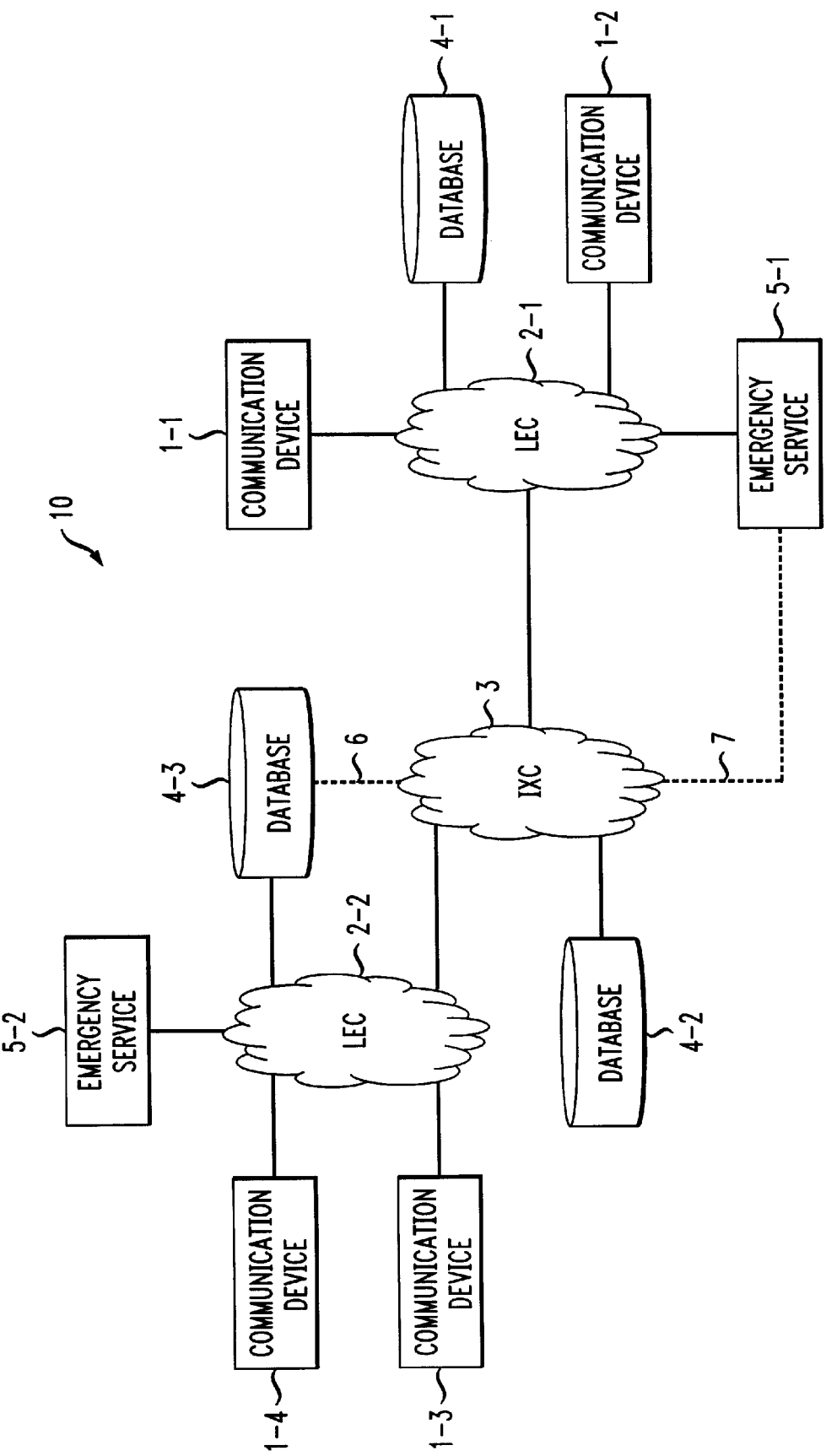
FIG. 1 is a schematic block diagram of a communication system.

FIG. 1 is a schematic block diagram of a communication system 10. The communication system 10 is only one example of different types of communication systems that can be used in conjunction with the invention. That is, although the invention is described in connection with a telecommunications network, other communication networks, including wireless, cable and computer networks, such as the Internet, can be used in addition to or in place of a telecommunications network. Thus, the communication system 10 can be configured in any desired fashion and contain fewer or more elements than those shown in FIG. 1.

Moreover, although the invention is described in connection with a telephone call, the term "call" can include other types of communications including multimedia conferences, video conferences, radio communications, etc. The invention is also described in connection with a telephone call to a single called party, but can be used with calls between multiple parties, e.g., a conference call.

A plurality of communication devices 1, such as telephones, programmed personal computers, facsimile machines, etc., can communicate with each other through a local exchange carrier (LEC) 2 and/or an interexchange carrier (IXC) 3. The LECs 2 and IXC 3 are shown only schematically in FIG. 1 and contain various components, such as routing switches, communication links, controllers, memory devices, etc., which are well known in the art and are not discussed in detail here.

For example, the communication device 1-1 can be used to make a telephone call or otherwise exchange communications information with the communication device 1-2 through the LEC 2-1, or the communication device 1-1 can be used to exchange communications information with the communication device 1-3 through the LEC 2-1, the IXC 3, and the LEC 2-2. A caller using the communication device 1-1 to conduct a call with a called party can request and receive emergency services during the call without actively terminating the call. That is, the caller can send a request for emergency services, such as by dialing a predetermined DTMF sequence, such as "911", using a keypad on the communication device 1-1, that is recognized by either the LEC 2-1 or the IXC 3. The request for emergency services can take other forms, such as the activation of a dedicated emergency services key on the communication device 1-1, speaking a word or set of words that are voice-recognized by the LEC 2-1 or the IXC 3, selecting an emergency service icon on a computer display, etc. Upon recognizing the request for emergency services, the LEC 2-1 can access a database 4-1, such as a Public Safety Administration Platform (PSAP) database to determine an appropriate emergency service 5 to which the communication device 1-1 should be connected.

Using the database 4, the LEC 2-1 can determine an appropriate emergency service 5 to which the requesting communication device 1 should be connected. The determination of which emergency service 5 to connect the communication device 1 to can be made based on various criteria, such as a physical location of the communication device 1, the type of emergency services requested, e.g., police, fire, ambulance, poison control, etc., or other desired criteria. In this example, the LEC 2-1 determines that the communication device 1-1 should be connected to the emergency service 5-1 and obtains routing information for routing the call to the emergency service 5-1. Although the LEC 2-1 is shown as communicating with only a single emergency service 5-1, the LEC 2-1 could communicate with multiple emergency services 5.

The emergency services 5 shown in FIG. 1 can include various components, human operators, and other communications systems, as desired. For example, each emergency service 5 can include a communication device, such as a telephone, that is used by a human operator to answer emergency calls. The emergency service 5 can also include other communication systems, such as a radio communication network, that allow the human emergency services operator to contact other emergency service providers, such as a fire station, police station, etc., and dispatch the emergency service providers to an appropriate location. Systems for providing emergency services, such as conventional 911 services, are well known in the art and are not described in detail here.

As mentioned above, the IXC 3 could receive the request for emergency services from the communication device 1-1 instead of the LEC 2-1. For example, the requesting party could designate that the IXC 3 should handle the request, e.g., by dialing a predetermined alphanumeric key or sequence of keys such as "922", or the IXC 3 could be set up to handle all emergency service requests made during interstate calls or when the identity of the party needing emergency services is not clear from the request, for example. In this case, the IXC 3 could access the database 4-1 local to the LEC 2-1 to determine the appropriate emergency service 5 and routing information, or the IXC 3 could access a database 4-2 that is maintained by, or otherwise provided for, the IXC 3. The database 4-2 could contain information identical to that contained in the database 4-1, or the database 4-2 could contain additional supplemental information or entirely different information. For example, the database 4-2 could contain more universal emergency services information that is useful for more than persons in a specific geographic region. For example, the database 4-2 could contain routing information for a national poison control center such that a person using the communication device 1-1 could communicate with a national poison control operator through the IXC 3. Alternately, the database 4-2 could operate as an emergency services directory service so that a person that requests emergency services through the IXC 3 could obtain emergency services directory assistance information, such as police or fire station telephone numbers for any geographic region in the country, and optionally be connected to police or fire station without having to dial the telephone number.

The IXC 3 could access a database 4-3 that is local to a LEC 2-2 through an optional direct link 6. Thus, the IXC 3 could obtain emergency services information directly from an LEC 2's database 4. The IXC 3 can also connect a caller, such as one using the communication device 1-1 directly to an emergency service 5-1 through a direct link 7 to the emergency service 5-1. Alternately, the IXC 3 could connect the communication device 1-1 to the emergency service 5 through an LEC 2.

The IXC 3 could also connect a requesting party to a regional emergency service operator that determines the nature of and the location where the services needed. The regional operator could dispatch emergency service providers to the appropriate location, connect the requesting party and any other bridged parties to a more local emergency service, or provided the requested information, e.g., how to treat a child that has eaten a poisonous substance.

When the communication device 1-1 is connected to the emergency service 5, the original call between the communication device 1-1 and the communication device 1-2 or 1-4 need not be terminated. That is, the communication devices 1-1 and 1-2 or 1-4 can be bridged to the call to the emergency service 5. This can be particularly useful when the person needing emergency services cannot communicate with an emergency service operator to provide needed information, such as a current medical status, exact location where emergency services are needed, etc. For example, the called party using the communication device 1-4 could speak with the emergency service 5 operator to provide needed information if the caller using the communication device 1-1 becomes incapacitated, or speaks a language foreign to the emergency services 5 operator. Alternately, the original call could be terminated when the communication device 1-1 is connected to the emergency service 5.

In addition to being able to request emergency services for oneself, a party involved in an ongoing telephone call can request emergency services for another party involved in the call. For example, a person using the communication device 1-1 during a telephone call with a person using the communication device 1-4 can request emergency services for the person using the communication device 1-4. The request for emergency services can be identified and acted upon by either the LEC 2-2 or the IXC 3. If the LEC 2-2 recognizes the request for emergency services, the LEC 2-2 can access the database 4-3 to determine which emergency service 5 should be connected to the ongoing call. If the IXC 3 recognizes the request for emergency services, the IXC 3 can identify an appropriate emergency service 5 by accessing the database 4-2, or by directly accessing the LEC 2-2's database 4-3 through the link 6. In this example, the emergency service 5-2 is the appropriate emergency service 5 and is connected for communications with both the communication devices 1-1 and 1-4.

As one example, the person using the communication device 1-1 can designate the communication device 1 for which the emergency services are requested by being prompted, after making an initial request for emergency services, to "press 1 for emergency services at your location, or press 2 for emergency services at the other caller's location." Alternate methods for designating the location where emergency services are requested can be used, including voice-recognition techniques, entering a specific DTMF sequence to indicate the location, communicating with a regional emergency services operator, etc. Designating the location where emergency services are needed can ensure that a proper emergency service 5 is connected to the requestor.

FIG. 2 is a flowchart of steps of a method for providing emergency services. In step 100, communication services are provided to send communication information between a caller and at least one called party. For example, a caller and one or more called parties can engage in a local or a long distance telephone call, a conference call, video conference, multimedia conferencing session, etc. The communication services can be provided by a local exchange carrier, a plurality of local exchange carriers in conjunction with an interexchange carrier, wired and/or wireless communication systems, a cable network, etc. The caller and/or the called party can use various different types of communication devices, including wired and wireless telephones, cellular telephones, facsimile devices, etc.

In step 200, a request from either the caller or a called party is received for access to emergency services. The request can take various forms, including a DTMF sequence that is entered by the caller or called party using a key or set of keys on a communication device, a spoken word or set of words that is (are) recognized using a voice-recognition system, etc. The request can be recognized by a local exchange carrier or an interexchange carrier involved in providing the communication services.

In step 300, the requesting party is connected to appropriate emergency services. Connecting the requesting party to emergency services can involve various processes depending upon the type of services requested, the type of carrier that recognizes the request for emergency services, etc. For example, if a local exchange carrier receives the request for emergency services, the local exchange carrier can access an appropriate Public Safety Administration Platform (PSAP) database to determine a correct routing number for the requested emergency services. The local exchange carrier can then connect the requesting party to the emergency services and either terminate the original call or bridge the caller and the called party together with the emergency services provider.

If an interexchange carrier receives the request for emergency services, the interexchange carrier can access an appropriate emergency services database, such as a PSAP or similar database that is maintained and/or local to the interexchange carrier, or that is maintained by a local exchange carrier. The interexchange carrier can access a local exchange carrier's database through a direct link to the database or through communications links in the local exchange carrier. Once an appropriate routing number or other addressing information is obtained for the emergency services, the interexchange carrier can connect the requesting party to the emergency services. Connection to the emergency services can be made through a direct link between the interexchange carrier and the emergency services, or through communication links associated with another carrier.

The emergency services provided can be conventional 911 services, or other types of services as desired. For example, the interexchange carrier could provide an emergency services operator that determines the nature of the desired emergency services from the requestor and then connects the requestor to the appropriate emergency services. In addition, the requestor can indicate the type of emergency services desired, for example, by dialing a specific number, e.g., "922", that designates a specific desired service. The requestor can also designate which party involved in an ongoing call should be provided emergency services. For example, one party involved in a telephone call may be incapacitated or otherwise unable to request emergency services or speak with an emergency services operator. In this case, the other party can request the emergency services, designate that the emergency services should be provided to the incapacitated party, and speak with the emergency services operator, if necessary. This can ensure that an emergency services provider that is local to where the emergency services are needed is accessed. As with the case when the local exchange carrier receives the emergency services request, the parties involved in an ongoing telephone call can be bridged to the emergency services operator, or the original telephone call can be terminated and only one of the parties connected to the emergency services operator.

The emergency services provided can be any type of emergency services, including conventional 911 services. For example, a requesting party can be connected to a police station, fire station, poison control center, or other emergency services dispatch operator. The emergency services can be provided on a national level by an interexchange carrier, such as providing poison control information to requesting parties, or by providing an emergency services directory service so that requesting parties can obtain telephone numbers or otherwise connect with emergency services providers in distant areas.

While the invention has been described in conjunction with the specific embodiments thereof, it is evident that many alternatives, modifications and variations will be apparent to those skilled in the art. Accordingly, embodiments of the invention as set forth herein are intended to be illustrative, not limiting. Various changes may be made without departing from the spirit and scope of the invention.

What is claimed is:

1. A method for providing emergency services during communication services over a network, comprising:

providing communication services by sending communication information via the network between a caller and at least one called party;

monitoring the communication information in the network for an in-call emergency services request;

detecting an in-call emergency services request from at least one of the caller and the called party for emergency services; and connecting at least one of the caller and the called party to appropriate emergency services, whereby the connection between the called party and the calling party is maintained.

2. The method of claim 1, wherein the step of providing communication services comprises sending telecommunications information between the caller and the at least one called party.

3. The method of claim 1, wherein the step of providing communication services comprises sending communication information between a caller and a called party through a local exchange carrier.

4. The method of claim 1, wherein the step of providing communication services comprises sending communication information between the caller and a called party through an interexchange carrier.

5. The method of claim 1, wherein the step of receiving a request comprises receiving a DTMF signal provided by one of the caller and the called party.

6. The method of claim 1, wherein the step of receiving a request comprises receiving a request from one of the caller and the called party for emergency services to be provided to the other of the caller and the called party.

7. The method of claim 1, wherein the step of receiving a request comprises an interexchange carrier receiving the request and the interexchange carrier accessing an emergency services database to obtain routing information for routing the emergency services request.

8. The method of claim 1, wherein the step of receiving a request comprises receiving information designating an identity of a party needing emergency services that is different than an identity of the party that provided the request.

9. The method of claim 1, wherein the step of connecting at least one of the caller and the called party comprises bridging the caller and the called party to an emergency service.

10. The method of claim 1, wherein the step of connecting at least one of the caller and the called party comprises connecting one of the caller and the called party to a regional emergency services operator.

11. The method of claim 1, wherein the step of connecting at least one of the caller and the called party comprises connecting at least one of the caller and the called party to emergency services through a direct link between an interexchange carrier and the emergency services.

12. The method of claim 1, further comprising providing one of the caller and the called party with emergency service directory assistance information.

13. A method for providing telecommunication services, comprising:

sending telecommunication information from at least one of the caller and a called party during a telephone call;

monitoring the telecommunication information in the telephone call for an in-call emergency services request;

reviewing an in-call emergency services request from at least one of the caller and a called party for emergency services; and connecting at least one of the caller and a called party to appropriate emergency services, whereby the connection between the called party and the calling party is maintained.

* * * * *

UNITED STATES PATENT AND TRADEMARK OFFICE
CERTIFICATE OF CORRECTION

PATENT NO. : 6,292,542 B1
DATED : September 18, 2001
INVENTOR(S) : Mitchell K. Bilder Page 1 of 1

It is certified that error appears in the above-identified patent and that said Letters Patent is hereby corrected as shown below:

<u>Title page,</u>
Item [12], should read -- Bilder, et al --.
Item [75], should read -- Mitchell K. Bilder, Manalapan, NJ; Jac P. Dowens, Red Bank, NJ --.

Signed and Sealed this

Fifteenth Day of January, 2002

Attest:

Attesting Officer

JAMES E. ROGAN
Director of the United States Patent and Trademark Office